Feb. 17, 1970  J. DEFORGES  3,495,897
DEVICE FOR MEASURING THE PUPILLARY DISTANCE
Filed July 27, 1967  4 Sheets-Sheet 4

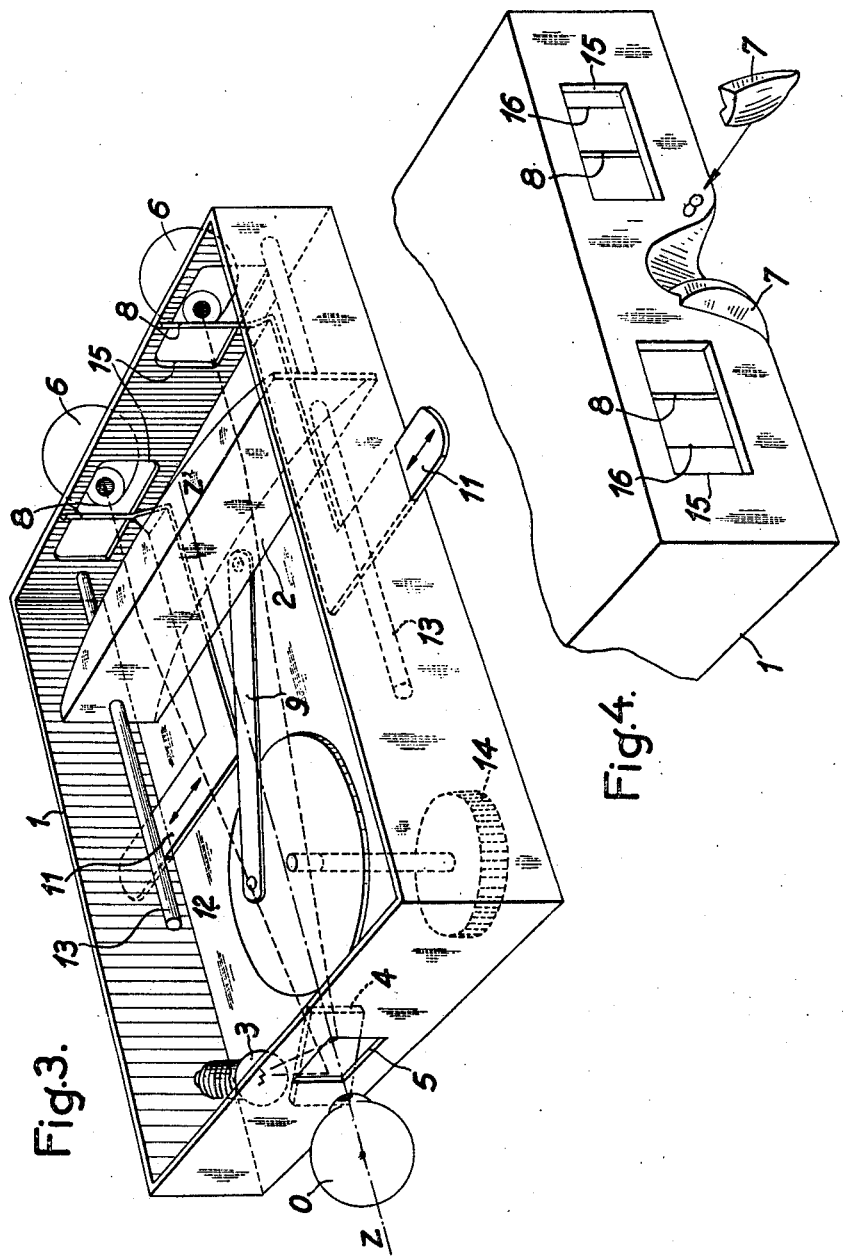

United States Patent Office 3,495,897
Patented Feb. 17, 1970

3,495,897
DEVICE FOR MEASURING THE PUPILLARY DISTANCE
Jean Deforges, Paris, France, assignor to Societe des Lunetiers, Temkine & Cie, Paris, France
Filed July 27, 1967, Ser. No. 656,586
Claims priority, application France, Aug. 4, 1966, 72,096
Int. Cl. A61b 3/10; G02b 27/02
U.S. Cl. 351—5
4 Claims

ABSTRACT OF THE DISCLOSURE

A device for measuring the pupillary distance of a subject, which comprises a box having a sighting window formed in the middle of a lateral wall, nose plates disposed centrally of the opposite lateral wall of said box, and on either side of said nose plates apertures corresponding to the eyeglasses of spectacles, a convergent lens adapted to be removed parallel to itself along its axis, said lens axis being coincident with the median and common axis of said sighting window and nose plates, means for adjusting the lens, a light source coincident with the focus of said lens and of its optical axis due to the provision of a non-silvered mirror set at 45° in front of said sighting window substantially coincident with the lens focus, and measuring means disposed in the plane of said apertures.

FIELD OF THE INVENTION

This invention relates to an ophthalmic device for facilitating the measurement of the monocular distances and of the total pupillary distance of the eyes of a subject, as well as the distance from the eyeglasses of a spectacle frame to each eye.

PRIOR ART

It is known to measure the pupillary distance of the eyes of a subject by calculating for each eye the position of the reflection on the cornea, the latter behaving like a convex spherical diopter, of a light spot directed or positioned to infinity. The observer sees the subject's pupils in their position obtaining when the subject looks to infinity, and when the subject is caused to observe a relatively near point, the eyes converge toward this point, and in each case the pupillary distance can be measured.

SUMMARY OF THE INVENTION

This device comprises essentially a box in which are mounted a lens adapted to be moved parallel to itself along its axis and a light source disposed at the focus of said lens and preferably offset geometrically from the optical axis of the lens by means of a non-silvered mirror set at 45°, whereby said optical axis can be used as a sighting axis, said box having formed in two opposite lateral walls thereof at one end an orifice so disposed as to position the observer's eye substantially at the focus of said lens, and at the other end a pair of nose plates and, on either side and symmetrically thereto, a pair of apertures corresponding to an eyeglass spectacle frame or mount, measuring means being disposed in the plane of these apertures set in the position of eyeglasses.

As the focus of the plano-convex lens is substantially coincident with the light source and the observer's eye, the image of this source is seen by the two eyes of the subject looking to infinity in two substantially parallel directions, and the image of the subject's eye as seen by the observer through said lens corresponds to the position of the pupils for infinity vision.

By moving a movable reference line in the plane of each aperture and causing this line to be coincident with the corneal reflection, the trace of the pupil axes in the plane of said apertures and therefore in the plane of the corresponding eyeglasses is obtained.

By measuring the distance from the reference lines and the nose axis determined on the subject by means of said nose plates, the monocular distances and the total distance for distant-sight vision are obtained.

By moving the lens along the sighting axis the observer can likewise measure the variation in the relative distance between the corneal reflections for near-sight vision and also for intermediate-sight vision.

Therefore, this apparatus permits of measuring simply, rapidly and accurately the pupillary distance for far-sight, near-sight and close-sight vision, and thus determine the defects of rotation of the eye and any asymmetry likely to be present in this rotation.

For measuring the distance from the eyeglass to the eye, a fixed reference line is disposed in the plane of each aperture, the measurement being effected by aligning this reference line with the outermost point or point of tangency of the corresponding eye of the subject. The movable reference line is placed against the outermost or convex portion of the eyeglass, and the distance between the two reference lines gives the distance from the eye to the spectacle eyeglass.

In order to afford a clearer understanding of this invention and of the manner in which the same may be carried out in practice, reference will now be made to the accompanying drawings, in which:

BRIEF DESCRIPTION OF THE DRAWING

FIGURE 3 is a view showing in perspective the measurement means incorporated in the apparatus, the top and front walls of the box being removed for the clarity;

FIGURE 4 is a perspective view of the apparatus as seen from the subject's side;

DESCRIPTION OF THE PREFERRED EMBODIMENT

Figure 1:
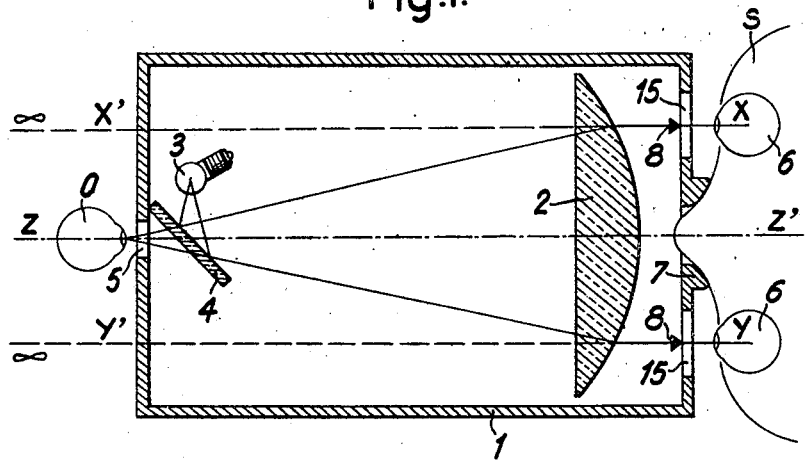
FIGURE 1 is a diagrammatic sectional view of the apparatus for measuring the far-sight vision.

Mounted in the box 1 are a plano-convex convergent lens 2 movable parallel to itself along the sighting axis ZZ' and a light source 3 the beam of which is reflected by a non-silvered mirror 4 toward the lens 2.

The observer O sees through the orifice 5 located behind the mirror 4 the eyes 6 of the subject S which are disposed on either side of the sighting axis behind the eyeglass apertures 15 of the box; the positioning is facilitated by the provision of the movable, detachable and adjustable nose plates 7.

If the light source 3 is located at the focus of lens 2, the image of said light source formed by lens 2 is located at infinity (∞), and the respective corneas of the two eyes 6 looking at infinity along two parallel directions XX' and YY' (FIG. 1) give each, by reflection on their respective surfaces acting as convex mirrors, a point—image of said image located at infinity, the respective point—images formed by the two corneas being located in the vicinity of said corneas on the sight axes XX' and YY'.

The component elements are so disposed that the image is seen with a magnification greater than 1.

The observer moves the reference line 8, disposed across the window 15 in the vicinity of the eye 6, in front of these luminous spots, and measures the pupillary distance, that is, the distance between the corneal reflections, for far-sight vision.

Figure 2:
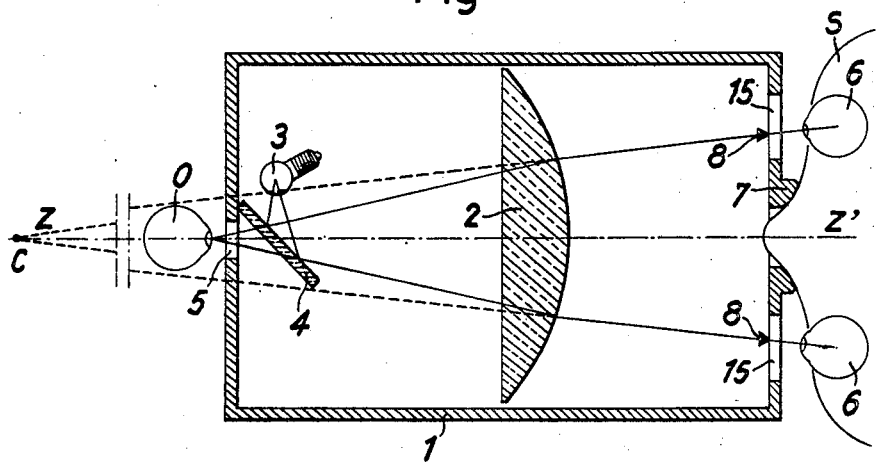
FIGURE 2 is a similar view corresponding to near-sight vision.

By moving the lens 2 for example in order to cause the image of the light source to be formed at C, this point C being located for example at 30 centimeters from the subject's eyes, i.e. for a position corresponding to a near-sight vision, the paths of the subject's sights on the reference plane permits of measuring the pupillary distance for near-sight vision (FIGURE 2). It is only necessary to bring the movable reference lines 8 on the path of the light beams.

The movable reference lines 8 may be controlled by means of a pair of rods 11 disposed on the bottom 12 of the apparatus; the lens 2 slidably guided by a pair of fixed parallel rods 12 is adapted to move along this bottom under the control of a knurled knob 14 carrying adequate scale means corresponding to the distance from point C; this knob 14 is coaxial to and solid with a disc 10 having a radial point thereof connected through a link 9 to the center of the lens 2.

Figure 5:
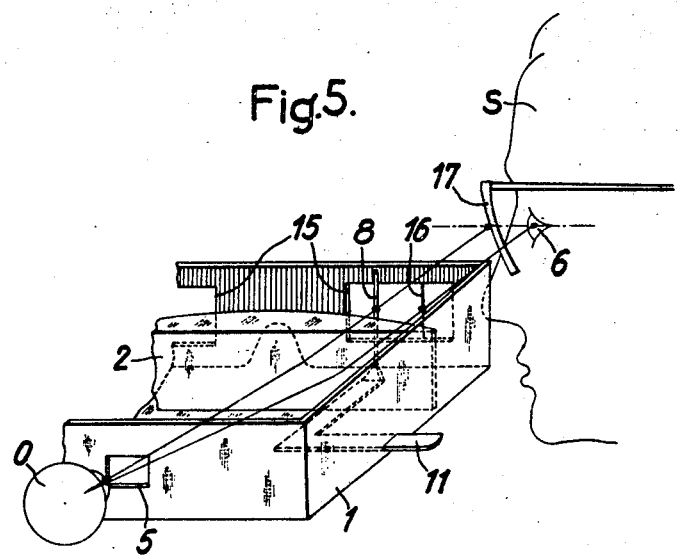
FIGURE 5 is a perspective view of the apparatus for measuring the distance from the eyeglass to the eye.
Figure 6:
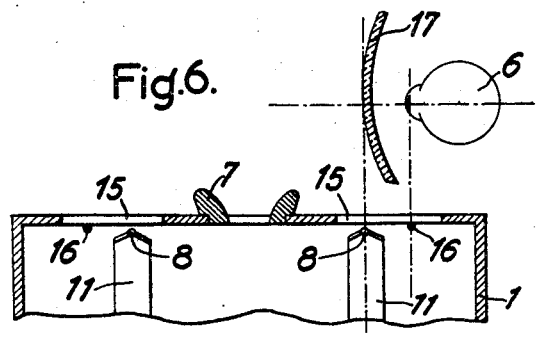
FIGURES 6 and 7 are explanatory views concerning this last-mentioned measurement.
Figure 7:
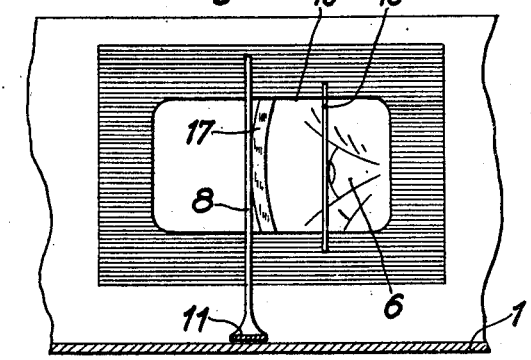

In addition to the movable reference line 8 a fixed reference line 16 is associated with each window 15 (FIGURE 4), whereby the observer can measure the distance between each eye of the subject and the eyeglass 17 of a spectacle frame (FIGURES 5 to 7).

Assuming that the subject S is placed at one end of the apparatus, the observer O looks through one of the windows 15 at the opposite end and adjusts the position of the movable reference line 8 in relation to the fixed reference line 16 disposed tangent to the cornea of the eye 6, until the movable reference line is tangent to the eyeglass, thus giving the distance from the subject's eye 6 to the eyeglass 17. This distance is seen with the magnification given by the lens 2 as shown in FIGURE 7.

Figure 8:
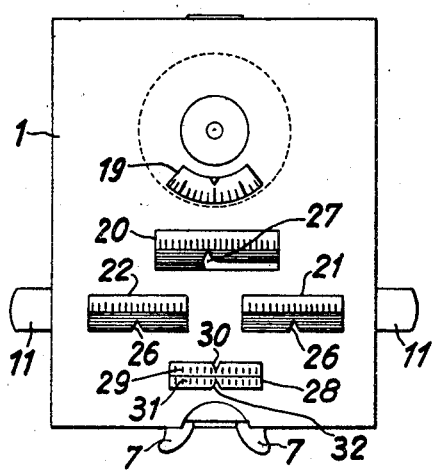
FIGURE 8 is a diagrammatic view showing the reading side.
Figure 9:
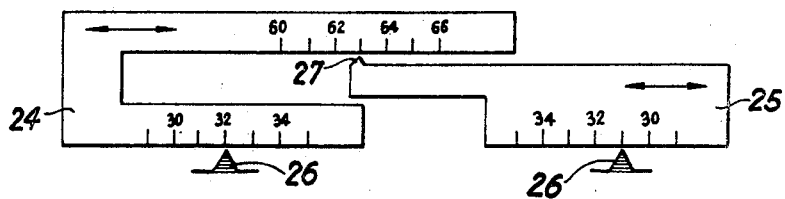
FIGURE 9 illustrates the principle of the relative movements of the scales for reading the monocular distances and the total distance.
Figure 10:
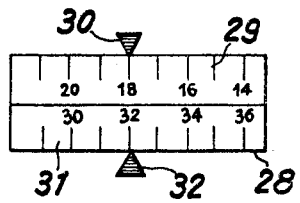
FIGURE 10 is a detail view showing a window for measuring the distance from the spectacle eyeglass to the eye.

To simplify the various readings, the reading side of the apparatus may be disposed as shown diagrammatically in FIGURES 8 to 10.

The movement of the lens 2 shows in the window 19 the measurement of the distance C, and in window 20 the observer can read the total pupillary distance (FIGURE 1), windows 21 and 22 further permitting the separate reading of the monocular distance for the right-hand and left-hand eyes, according to the movement of the member 11 controlling the movable reference lines 8 (FIGURE 2).

For measuring the pupillary distance, the two movable reading scales 24 and 25 permit the measurement of the monocular distances and of the total distance (illustrated in FIGURE 9); they are aligned in front of stationary indices 26 in relation to the apparatus; index 27 is rigid with one of said scales, for example scale 25, so that the opposite scale 24 gives the total of the displacements of both scales.

The window 28 is intended for reading the distances from the subject's eye to the eyeglass surface. Thus, for instance, on the scale 29 in front of the fixed index 30 one reads the distance from the eyeglass to the right-hand eye of the subject. Similarly, the observer reads on the scale 31 in front of index 32, the same distance but for the left-hand eye. These scales are rigid with pull lugs for adjusting the movable reference lines. Under these conditions, this window 28 may be dispensed with, and for the right-hand eye the reference line 30 may be superposed to reference line 26 of window 21, the scale 29 being printed for example above the monocular distance scale at 25. The same applies of course to the left-hand eye.

What I claim is:

1. A pupillometer for measuring, at least for far-vision and close-vision, the respective distances from the symmetry-plane of a subject's nose to the points of intersection of the sight axes of said subject's eyes with a plane substantially spaced from said eyes a distance corresponding to the eye-eyeglass distance between said eyes and the eyeglasses of the spectacles to be worn by said subject, which comprises a box having a sighting window formed in the middle of a first lateral wall of said box, nose plates disposed centrally of a second lateral wall of said box opposite to said first lateral wall, and on either side of said nose plates means providing apertures in said second lateral wall, said second lateral wall, said nose plates and said apertures forming such a spectacle's frame that said apertures are located in a plane substantially spaced said eye-eyeglass distance from the eyes of a subject whose nose is fitted between said nose plates, said pupillometer further comprising inside said box a convergent lens adapted to be moved parallel to itself along its axis, said lens being coincident with the median and common axis of said sighting window and nose plates, said sighting window being coincident with the lens focus when said lens is in its position corresponding to far-vison measuring condition, means connected to said lens for moving the same in said box, a non-silvered mirror disposed between said sighting window and said lens and set at 45° with respect to said lens axis, a fixed light source symmetrically arranged with said sighting window as to said mirror and said lens forming by reflection on each cornea of the subjects's eyes a luminous point-image located on the sight axis of the corresponding eye, movable reference lines substantially located in the plane of said apertures and movable inside said apertures, and measuring means comprising scales and indexes the relative positions of which depend on the respective positions of said movable reference lines whereby at least the respective distances between the symmetry-plane of the subject's nose and each of said points of intersection can be accurately determined without parallax error by an observer aiming through said sighting window with one eye successively at each of said luminous point-images along the respective sight axes of the subject's eyes by adjusting successively said movable reference lines in front of said luminous point-images.

2. A pupillometer according to claim 1 which comprises other measuring means composed of a scale and an index one of which is movable in front of the other in relation to the position of the lens in the box, said scale being so graduated to indicate in cooperation with said index the distance between the subject's eyes and the image of the luminous source seen by said subject through said lens, which lens is movable within such a range that said distance can be adjusted within a range of 30 cm. to infinity.

3. A pupillometer according to claim 1, which comprises a fixed reference line at least in one of said apertures, a scale the zero of which is aligned with said fixed reference line, and an index aligned and movable with the movable reference line associated with said aperture, whereby when said lens is so positioned that its focus is coincident with said sighting window, the eye-eyeglass distance can be determined by said observer by placing said fixed reference line tangent to the cornea and by adjusting said movable reference line, which is composed of a line parallel to said fixed reference line, tangent to the outer surface of the eyeglass worn by the subject.

4. A pupillometer according to claim 2, wherein interchangeable nose plates of different sizes are provided, whereby the distance from the subject's eyes to the apertures may be adjusted according to the previously measured eye-eyeglass distance.

References Cited

UNITED STATES PATENTS

| | | | |
|---|---|---|---|
| 1,935,175 | 11/1933 | Clement | 351—5 X |
| 2,022,202 | 11/1935 | Hersch | 351—5 X |
| 2,159,277 | 5/1939 | Lee | 351—5 |
| 2,355,161 | 8/1944 | Holstein | 350—116 |
| 3,115,713 | 12/1963 | Johnston | 351—5 X |

FOREIGN PATENTS 238,178   9/1911   Germany.

OTHER REFERENCES

Bausch & Lomb advertisement, "Optometric Weekly," vol. 56, No. 43, p. 8, Oct. 28, 1965.

DAVID SCHONBERG, Primary Examiner

P. A. SACHER, Assistant Examiner

U.S. Cl. X.R.

33—200; 350—115